July 12, 1938.    R. S. JACOBSEN    2,123,189
CONVEYER
Original Filed March 12, 1934    2 Sheets-Sheet 1
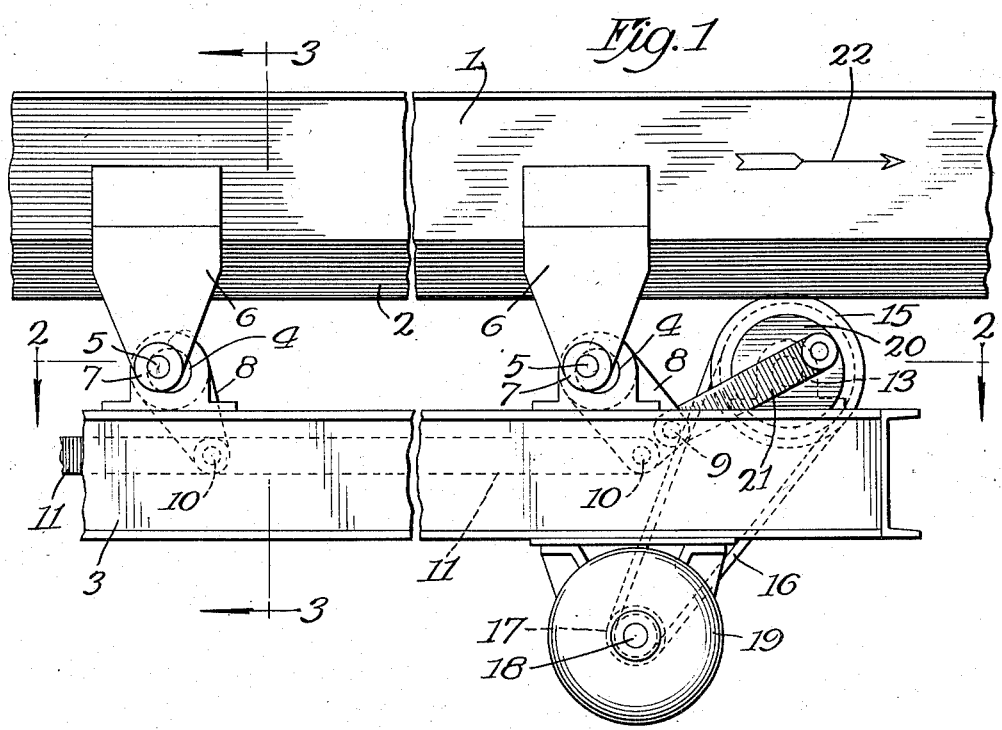
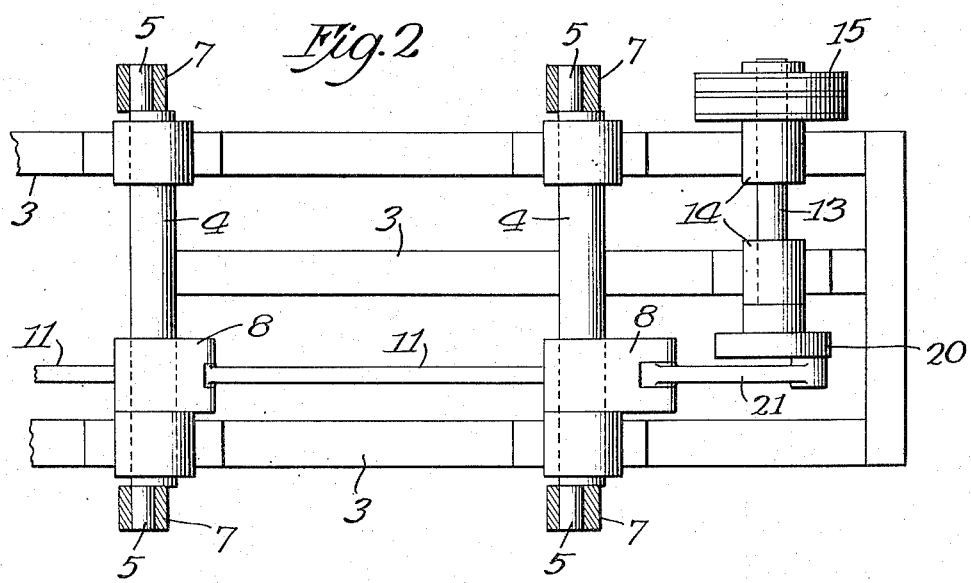
Inventor:
Richard S. Jacobsen
By Arthur F. Durand Atty.

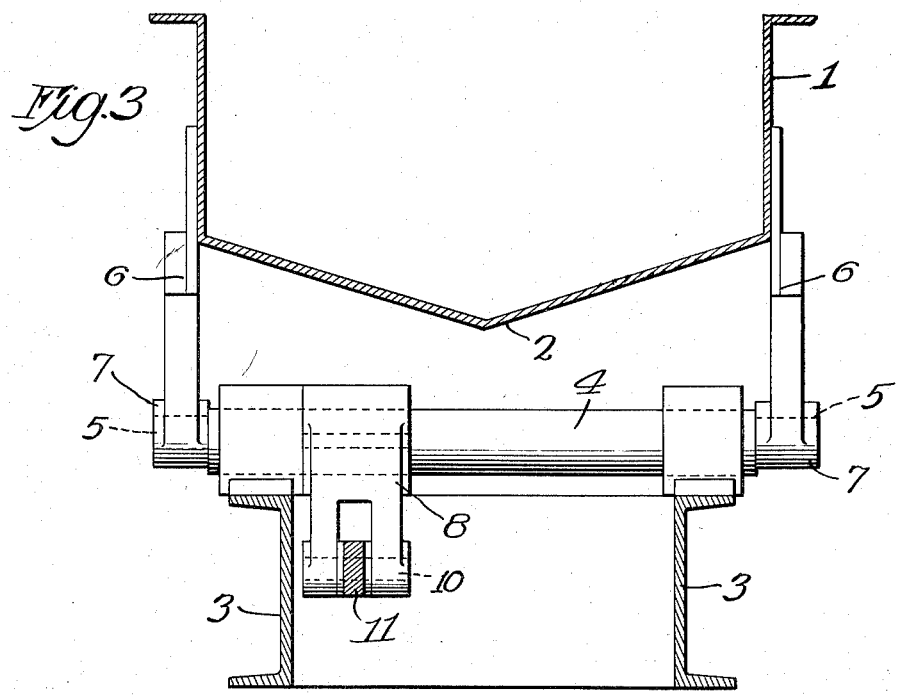
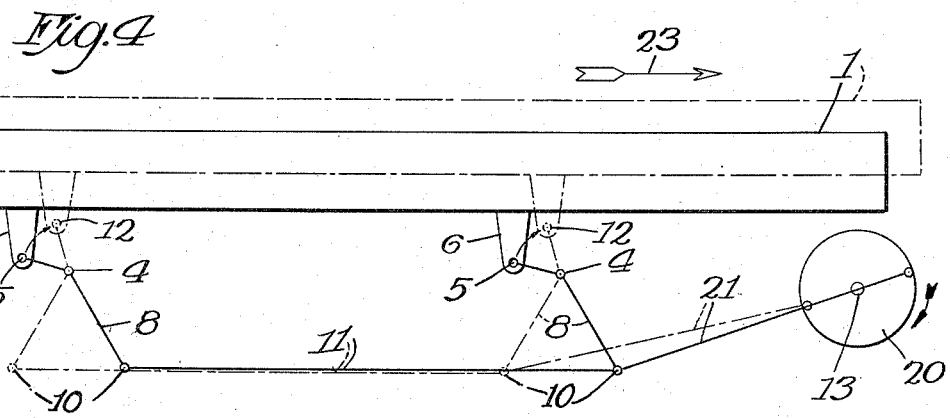
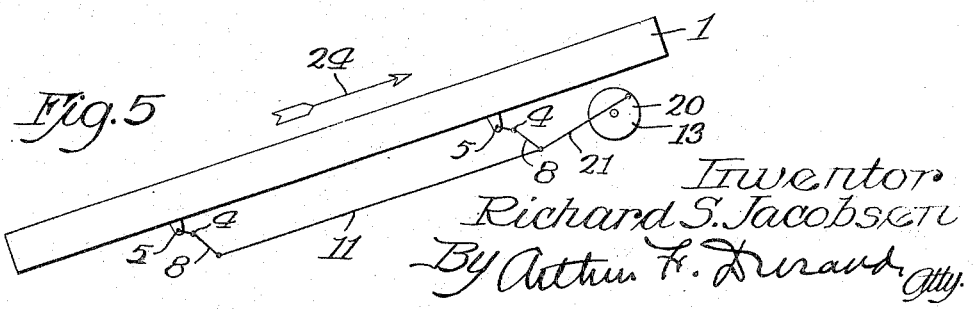

Patented July 12, 1938

2,123,189

UNITED STATES PATENT OFFICE 2,123,189

CONVEYER

Richard S. Jacobsen, Wheaton, Ill.

Application March 12, 1934, Serial No. 715,172
Renewed December 7, 1936

15 Claims. (Cl. 198—220)

This invention relates to conveyers, and more particularly to those that are in the form of a trough having some sort of movement that results in moving the materials intermittently therein, from one end of the trough to the other, for various purposes.

Generally stated, the object of the invention is to provide a novel and improved construction and arrangement whereby a conveyer trough of this kind has movement upward and then forward, to throw the materials forward a distance in the trough, and then has backward and downward movement under the materials, in a manner that leaves the latter a distance ahead for each cycle of movement of the trough, whereby the action of a trough conveyer of this kind is more effective to intermittently feed the materials forward in a satisfactory manner.

It is also an object to provide certain details and features of construction tending to increase the general efficiency and desirability of a vibratory trough conveyer of this particular character.

To the foregoing and other useful ends, the invention consists in matters hereinafter set forth and claimed and shown in the accompanying drawings, in which—

Fig. 1 is a side elevation of a trough conveyer involving the principles of the invention, showing certain portions thereof broken away for convenience of illustration, it being understood that the trough can be of any suitable or desired length necessary for any particular situation, or for any particular kind of work.

Fig. 2 is a horizontal section on line 2—2 in Fig. 1 of the drawings.

Fig. 3 is a transverse section, on a larger scale, on line 3—3 in Fig. 1 of the drawings.

Fig. 4 is a diagrammatic view illustrating the particular motion of the conveyer trough, in the operation thereof.

Fig. 5 is a similar diagram, in which the apparatus and operation are the same as in Fig. 4, but showing the entire apparatus disposed at an angle, instead of horizontally.

As thus illustrated, the invention comprises a sheet metal trough 1, or a trough of any suitable material, preferably provided with a V-shaped bottom 2 of obtuse angle, so that the materials in the trough will have a tendency to crowd tightly together transversely thereof, thereby in effect increasing the frictional grip of the trough on the materials, for the purpose of more effectively feeding the materials forward.

A frame or bed 3 is provided, of any suitable form, and on the top of this frame or bed there are transverse rock shafts 4 having cranks or eccentric end portions 5, as shown. These eccentric cranks are in effect arms pivoted at their upper ends at fixed points on the trough structure and at their lower ends on the body of the machine, as illustrated in Fig. 4 of the drawings. Brackets 6 are rigidly secured to the trough, at opposite sides thereof, and have their lower ends provided with bearings 7 for the eccentric end portions 5 previously mentioned. Each shaft is provided between the sides of the frame or bed with a downwardly extending crank arm 8, one crank arm having its lower end provided with a pivotal point 9, and each having a pivotal point 10, as shown. The first crank arm, the one at the right, is connected to the next crank arm by a link 11 extending from the pivotal point 10 on the first crank arm to the pivotal point 10 on the second crank arm, and this system of crank arm connection is employed from one end of the apparatus to the other, whereby the rock shafts 4 are connected to rock in unison during the operation of the conveyer.

Looking at Fig. 4 of the drawings, it will be seen that a movement of the link 11 to the left, with the connection shown, will cause the eccentric end portions 5 to move from their normal positions upwardly and forwardly to their upper positions, indicated at 12 in said diagram. Therefore, the feeding movement of the trough is first upward and then forward and substantially horizontal, so that the entire forward stroke of the trough is first slow and then gradually increases in speed until the maximum forward movement is reached at the point 12, thus throwing the materials forward a distance in the trough. Then the backward movement of the trough, the entire backward stroke thereof, starts quickly and ends slowly, as the termination of the backward movement is more vertical than horizontal.

Any suitable or desired means can be employed for rocking the shafts 4, to produce the described specific movement of the trough. As shown in Figs. 1 and 2 of the drawings, a horizontal shaft 13 is arranged horizontally on the frame or bed of the apparatus, in bearings 14 thereon, and is provided with a pulley 15 that receives power through a belt 16 from a smaller pulley 17 on a shaft 18 mounted transversely below the said frame or bed, said shaft 18 being provided with a pulley 19 for the transmission of power thereto. At its other end, the shaft 13 is provided with a crank plate 20 having its crank connected by a link 21 with the pivotal point 10 on the first crank arm 8 previously described.

The rotation of the shaft 13, and the consequent reciprocation of the link 21, will cause the rock shafts 4 to rock in unison and the consequent operation of the conveyer, in the manner explained.

Instead of arranging the trough 1 horizontally, or exactly horizontal, it may be arranged at an angle, as shown in Fig. 5 of the drawings, as it is found that materials can be conveyed upwardly at an angle of 18 to 25 degrees, or less, quite effectively, with a trough conveyer having the particular intermittent motion shown and described. In the drawings, it will be understood that the materials are moving intermittently to the right, as indicated by the arrow 22 in Fig. 1 of the drawings, and the arrows 23 and 24 in Figs. 4 and 5 of the drawings. With the motion shown and described, short strokes of the trough are sufficient, as high speed is possible, thereby in effect keeping the materials moving practically continuously forward in the trough, although the movement of the latter is in fact intermittent.

Looking at Figs. 4 and 5 of the drawings, it will be seen that any given point on the trough traverses substantially the upper rear quarter of a circle, so that the actual forward motion of the trough is increasingly faster, while its actual backward motion is increasingly slower. The actual upward movement of the trough is increasingly slower, while its actual downward movement is increasingly faster. But in figuring these variable speeds allowance should be made for the effect of the crank plate 20 and periods of speed of the link 21 previously mentioned.

Thus it will be seen that the up stroke terminates approximately in horizontal motion a distance from said vertical line which is substantially less than the length of the stroke, while the down stroke terminates approximately in vertical motion a distance from the horizontal line, with the middle point of each stroke substantially midway between the vertical and the horizontal, thus insuring relatively high speed for the middle portion of each stroke, in each direction, whereby the speed tapers off to practically zero at the end of each stroke, but increases practically from zero to maximum at the beginning of each stroke, and with this motion and speed the materials are off the trough during the end portion of each upward movement or stroke, and the trough moves back under the materials before the latter again rest on the trough.

With the arcuate stroke provided, and the specified speed of travel thereof, it will be seen that the materials will leave the trough at the middle of the up stroke thereof, with a trajectory of substantially or approximately forty-five degrees, whereby the materials are off the trough during the slowing up portion of each up stroke. A trajectory of forty-five degrees, of course, is calculated to insure the greatest distance of travel from the point of projection to the point of final descent, and the operation of the crank arms, in the manner explained, insures that desirable result, tending to increase the speed of travel of the materials from one end of the trough to the other, by practically jumping the materials ahead a maximum distance, for each up stroke of the trough, with practically no retrograde movement of the materials between the successive forward jumps thereof.

This is all true of both Fig. 4 and Fig. 5, of course, as in the latter the arms between the points 4 and 5 have the same motion that these arms have in Fig. 4, relative to the trough, and in each case the arms 5 swing equidistant at opposite sides of lines at right angles to the trough and intersecting the axes 4 thereof. In other words, Fig. 5 is simply the entire diagram of Fig. 4, with the said imaginary vertical and horizontal lines, all turned or tilted at an angle.

The proper speed of operation, for any given materials, can be determined by experimenting with different speeds, until the desired result is obtained.

What I claim as my invention is:

1. In a conveyer apparatus, the combination of a trough for holding the materials to be conveyed, supporting mechanism for giving the trough a forward stroke that is upward and increasingly horizontal, on the line of the upper portion of a circle, in rear of the vertical center line of said circle, and above the horizontal center line thereof, and a back stroke on said arc of the circle that is increasingly vertical, together with devices for operating said mechanism to thereby cause said back and forth arcuate motion of the trough to extend more than half the distance between said lines, with an appreciable curvature, so that the up stroke terminates approximately in horizontal motion a distance from said vertical line which is substantially less than the length of the stroke, and the down stroke terminates approximately in vertical motion a distance from the horizontal line, with the middle point of each stroke substantially midway between the vertical and the horizontal, said mechanism comprising transverse rock shafts below the trough, having eccentric end portions, rigid brackets extending downward on the sides of the trough and having bearings for said eccentric end portions, and means connecting said shafts, movable in one direction while the trough is moving in the opposite direction, forming counterbalancing means for the trough, said devices comprising power means for rocking said shafts, for causing said eccentric end portions to each travel upwardly and forwardly on the line of said circle, and then backwardly and downwardly.

2. In a conveyer apparatus, the combination of a trough for holding the materials to be conveyed, supporting mechanism for giving the trough a forward stroke that is upward and increasingly horizontal, on the line of the upper portion of a circle, in rear of the vertical center line of said circle, and above the horizontal center line thereof, and a back stroke on said arc of the circle that is increasingly vertical, together with devices for operating said mechanism to thereby cause said back and forth arcuate motion of the trough to extend more than half the distance between said lines, with an appreciable curvature, so that the up stroke terminates approximately in horizontal motion a distance from said vertical line which is substantially less than the length of the stroke, and the down stroke terminates approximately in vertical motion a distance from the horizontal line, with the middle point of each stroke substantially midway between the vertical and the horizontal, said devices providing relatively high speed for the middle portion of the stroke, in each direction, and providing relatively slow starting and stopping for each stroke, so that the speed tapers off to practically zero at the end of each stroke, and increases practically from zero to maximum at the beginning of each stroke, whereby the materials are off the trough during the end portion of each upward movement, said mechanism comprising transverse rock shafts below the trough, having eccentric end portions, rigid brackets extending downward on the sides of the trough and having bearings for said eccentric end portions, and means connecting said shafts, movable in one direction while the trough is moving in the opposite direction, forming counterbalancing means for the trough, said devices comprising power means for rocking said shafts, for causing said eccentric end portions to each travel upwardly and forwardly on the line of said circle, and then backwardly and downwardly.

3. A conveyer apparatus comprising an oscillating trough mounted on supports comprising in effect crank arms so constructed that the trough supporting end of each of the arms moves through more than one-half of the upper rear quarter of a circle, between right angle lines intersecting the axis of the arms, one line parallel with the trough and the other line at right angles to it, and thus has an arcuate path practically equally divided by a radial line midway between said other lines.

4. A structure as specified in claim 3, comprising other crank arms in effect forming with said first mentioned arms a plurality of bell cranks, and means for communicating power to each bell crank and thereby through the cranks to the trough to oscillate the latter.

5. A structure as specified in claim 3, comprising other crank arms in effect forming with said first mentioned arms a plurality of bell cranks, and means for communicating power to each bell crank and thereby through the cranks to the trough to oscillate the latter, said power communicating means comprising a counterbalancing member connecting together the ends of said last mentioned arms.

6. A structure as specified in claim 3, comprising means including a counterbalancing member connecting said arms together.

7. A structure as specified in claim 3, comprising means including a counterbalancing member connecting said arms together, and means for communicating operating power to said member to oscillate said trough.

8. A structure as specified in claim 3, comprising means having a pendulum-like swing to counterbalance said trough.

9. A structure as specified in claim 3, said trough being horizontally disposed.

10. A structure as specified in claim 3, said trough being inclined.

11. A conveyer apparatus comprising an oscillating trough mounted on supports comprising in effect bell cranks so constructed that the outer trough supporting end of each of the arms move through the upper rear quarter of a circle, whereas the outer end of each of the other effective arms moves through an arcuate path equally divided by a line at right angles to the trough and intersecting the axis of the bell crank.

12. A structure as specified in claim 11, having counterbalancing means connecting together said other arms.

13. A structure as specified in claim 11, having means to communicate power to each of said other arms, to operate the trough.

14. A structure as specified in claim 11, said trough being horizontal.

15. A structure as specified in claim 11, said trough being inclined with its discharge end upward.

RICHARD S. JACOBSEN.